US012542371B2

(12) United States Patent
Christodoulides et al.

(10) Patent No.: US 12,542,371 B2
(45) Date of Patent: Feb. 3, 2026

(54) ANTENNA POLARISATION

(71) Applicant: BAE SYSTEMS PLC, London (GB)

(72) Inventors: Anastasios Christodoulides, Birmingham (GB); Alexandros Feresidis, Birmingham (GB)

(73) Assignee: BAE SYSTEMS PLC, London (GB)

( * ) Notice: Subject to any disclaimer, the term of this patent is extended or adjusted under 35 U.S.C. 154(b) by 133 days.

(21) Appl. No.: 18/289,804

(22) PCT Filed: May 12, 2022

(86) PCT No.: PCT/GB2022/051203
§ 371 (c)(1),
(2) Date: Nov. 7, 2023

(87) PCT Pub. No.: WO2022/238704
PCT Pub. Date: Nov. 17, 2022

(65) Prior Publication Data

US 2024/0291165 A1 Aug. 29, 2024

(30) Foreign Application Priority Data

May 14, 2021 (EP) .................................... 21386027
May 21, 2021 (GB) .................................... 2107279

(51) Int. Cl.
*H01Q 15/24* (2006.01)
*H01Q 3/36* (2006.01)
*H01Q 21/06* (2006.01)

(52) U.S. Cl.
CPC ............. *H01Q 15/244* (2013.01); *H01Q 3/36* (2013.01); *H01Q 21/062* (2013.01)

(58) Field of Classification Search
None
See application file for complete search history.

(56) References Cited

U.S. PATENT DOCUMENTS 3,089,142 A 5/1963 Wickersham, Jr.
3,267,480 A * 8/1966 Lerner ................. H01Q 15/244 343/911 R
6,906,685 B2 * 6/2005 English ................ H01Q 15/248 343/756

FOREIGN PATENT DOCUMENTS

CN 206962026 U * 2/2018 ........... H01Q 15/242
DE 19845870 A1 6/1999

OTHER PUBLICATIONS

International Search Report and Written Opinion dated Aug. 5, 2022 issued in PCT/GB2022/051203.

(Continued)

*Primary Examiner* — Crystal L Hammond
(74) *Attorney, Agent, or Firm* — Scully, Scott, Murphy & Presser, P.C.

(57) ABSTRACT

According to the present invention there is provided a polarisation converter comprising: a first element array layer extending in a plane comprising a first array of spaced apart electrically conductive dipole elements; a second element array layer extending in a plane comprising a second array of spaced apart electrically conductive dipole elements; a dielectric layer extending in a plane separating the first element array layer and the second element array layer, each element array layer having a first and second axis parallel to the plane of the respective element array layer, the first axis and second axis being perpendicular axes, wherein: one or both of the element array layers exhibits an anisotropic spatial property. An antenna system, vehicle and method of manufacturing a polarisation converter are also provided.

20 Claims, 9 Drawing Sheets

(56) References Cited

OTHER PUBLICATIONS

GB Search Report dated Feb. 1, 2022 issued in GB2107279.8.
Doumanis et al., "Surfaces for Linear to Circular Polarization Conversion", IEEE Trans. Antennas and Propagation, vol. 60, No. 1, pp. 212-219.

* cited by examiner

RELATED ART

ANTENNA POLARISATION

FIELD

The present disclosure relates to a polarisation converter. The present disclosure also relates to an antenna system for a communications apparatus. The present disclosure also relates to a vehicle having said antenna system. The present disclosure also relates to a method of manufacturing a polarisation converter.

BACKGROUND

Linear-to-circular polarisation converters are known in the art for converting linearly polarised electromagnetic (EM) radiation to circularly polarised EM radiation.

One example of a conventional converter comprises a dipole array printed on a grounded dielectric layer. A linearly polarised EM wave incident on the converter can be converted to a circularly polarised reflected EM wave.

However, conventional converters have poor angular stability. That is, the relationship between axial ratio of the reflected wave (which provides a measure of how circularly polarised said wave is) and frequency of EM radiation varies considerably depending on the angle of incidence of the incident linearly polarised radiation. Because of this, certain frequencies of EM radiation, which are suitably converted to circularly polarisation at one angle of incidence, are poorly converted at another angle of incidence. This is problematic, as it is therefore necessary to maintain a consistent angular relationship between the incident radiation and the converter in order to produce adequate circularly polarised output. This may be difficult to achieve in practice and limits widespread application of such converters.

It is an object of the present invention to provide an improved system and/or method thereof and/or address one or more of the problems discussed above, or discussed elsewhere, or to at least provide an alternative system and/or method.

SUMMARY

According to a first aspect of the present invention there is provided a polarisation converter comprising: a first element array layer extending in a plane comprising a first array of spaced apart electrically conductive dipole elements; a second element array layer extending in a plane comprising a second array of spaced apart electrically conductive dipole elements; a dielectric layer extending in a plane separating the first element array layer and the second element array layer, each element array layer having a first and second axis parallel to the plane of the respective element array layer, the first axis and second axis being perpendicular axes, wherein one or both of the element array layers exhibits an anisotropic spatial property. The polarisation converter may be a linear-to-circular polarisation converter.

In this way, a device having a double-layer dipole array structure is formed, with the ability to convert a linearly polarised incident wave to a circularly polarised reflected wave. Such a converter finds application in converting linearly polarised radiation from a linear antenna, which are readily available and are low-cost, to circularly polarised radiation for use in satellite, communication and sensing systems.

In one example, one or both of the arrays of dipole elements exhibits an anisotropic spatial property. In one example, the spacing between dipole elements of the array is different in the first and second axes. In one example, the periodicity of the array of dipole elements is different in the first and second axes.

In this way, linear-to-circular polarisation conversion is facilitated. "Anisotropic spatial property" may mean that a spatial property differs between the first and second axes, in one or both of the element array layers. Anisotropy is achievable through periodicity of the element array layers and/or spacing of the dipole elements.

In one example, one or both of the arrays of dipole elements has a first periodicity measured along the first axis, and a second periodicity measured along the second axis, the second periodicity being different to the first periodicity.

In this way, a polarisation converter having a doubly periodic anisotropic array structure is formed. Linear-to-circular polarisation of an incident EM wave is facilitated.

In one example, the first element array layer and second element array layer have the same first and second periodicity. That is, whilst the first and second periodicity may be different, the first element array layer may have an array of dipoles having dipoles spaced according to the first periodicity along the first axis, and spaced according to the second periodicity along the second axis, and the second element array layer may have the same arrangement. The first element array layer and second element array layer may have the same dimensions (i.e. total length and width).

Advantageously, this tends to lead to a structure in which dipole elements in the first element array layer have a high element coupling, which improves angular stability. Moreover, in construction of the converter, array layers having the same periodicity simplify construction. That is, the array layers may be formed from array layer sheets, or the array layers may be built up from constituent unit cells, which when assembled form the element array layers having the same first and second periodicity.

In one example, the dipole elements of the second element array layer are each located laterally displaced with respect to the dipole elements of the first element array layer.

In this way, a polarisation converter having an anisotropic array structure is formed. Linear-to-circular polarisation of an incident EM wave is facilitated.

In one example, the dipole elements of the second element array layer are each located laterally displaced along the first axis with respect to the dipole elements of the first element array layer.

In this way, a polarisation converter having an anisotropic array structure is formed. Linear-to-circular polarisation of an incident EM wave is facilitated. Nevertheless, this leads to a construction wherein some overlap between the dipole elements of the element array layers exists, which tends to provide for high element coupling and advantageous improvements in angular stability.

In one example, the dipole elements of the second element array layer are each located laterally aligned along the second axis with respect to the dipole elements of the first element array layer.

In this way, overlap between dipole elements of the element array layers exists, which tends to provide for high element coupling and advantageous improvements in angular stability. Some deviation from exact laterally alignment is possible without loss of angular stability. Nevertheless, this offset is not large enough to produce overlap along the second axis, as will be understood from the description herein.

In one example, a plurality of the dipole elements of the first element array layer and/or second element array layer exhibit an anisotropic spatial property.

Anisotropy is also realised by the shape or form of the dipole elements. In this way, a polarisation converter having an anisotropic array structure is formed. Linear-to-circular polarisation of an incident EM wave is facilitated.

In one example, each dipole element has a first dimension measured along the first axis, and a second dimension measured along the second axis, the first and second dimensions being different.

The anisotropic spatial property may thereby be defined. Whilst the dipole elements may be arbitrary in shape, having different first and second dimensions leads to anisotropy, which facilitates operation as a linear-to-circular polarisation converter.

In one example, in plan view, a region of one of the dipole elements of the first element array layer overlaps a region of one or more of the dipole elements of the second element array layer. In one example, in plan view, a region of one of the dipole elements of the first element array layer overlaps a region of one or more of the dipole elements of the second element array layer, along the first axis.

This provides a construction wherein some overlap between the dipole elements of the element array layers exists, which tends to provide for high element coupling and advantageous improvements in angular stability. High element coupling results in an increase of the effective electric length of the elements, which leads to a decrease of the array resonant frequency and thereby improves the angular stability of the polarisation converter. Overlap along the first axis tends to be advantageous for high element coupling. In some examples, there is no overlap along the second axis.

In one example, the end regions of one of the dipole elements of the first element array layer overlaps an end region of two of the dipole elements of the second element array layer. Such a construction has been found to be particularly advantageous. The overlap may be provided by a construction having two element array layers, where one of the layers is shifted appropriately to provide the described overlap, in plan view.

In one example, in plan view, between 1-50% of the length of one of the dipole elements of the first element array layer overlaps a region of one or more of the dipole elements of the second element array layer. In a preferred example, between 20-30% of the length of one of the dipole elements of the first element array layer overlaps a region of one or more of the dipole elements of the second element array layer. In a highly preferred example, around 26% of the length of one of the dipole elements of the first element array layer overlaps a region of one or more of the dipole elements of the second element array layer. The length overlap may be an area overlap, where appropriate (i.e. there may be a 1-50%, 20-30% or 26% overlap in area rather than length).

It will be understood by the skilled person that, due to the manner in which the first and second element array layers are arranged, the length or area of overlap, in plan view, of one of the dipole elements of the first element array layer with one or more dipole elements of the second element array layer may be the same as the length or area of overlap, in plan view, of one of the dipole elements of the second element array layer with one or more dipole elements of the first element array layer.

In one example, each dipole element has a rectangular cross-sectional profile, for example a solid rectangle or rectangular loop, or an ovoidal cross-sectional profile, for example a solid ovoid or an ovoid loop.

Such exemplary dipole element shapes have been found to be particularly advantageous. In this way, a polarisation converter having an anisotropic array structure is formed. Linear-to-circular polarisation of an incident EM wave is facilitated.

The polarisation converter may comprise a ground plane, wherein the first element array layer, dielectric layer and second element array layer are disposed above the ground plane. In one example, the ground plane is a grounded metal substrate. In one example the ground plane or grounded metal substrate is mounted on, or forms part of, the polarisation converter or an antenna system comprising the polarisation converter. This provides for a versatile and self-contained polarisation converter. In another example, the ground plane or grounded metal substrate is mounted on, or forms part of, a vehicle to which the polarisation converter is attached. In other words, when a polarisation converter is attached to the vehicle, it may use part of the vehicle as a ground plane. In this way, body panels of such vehicles, for example, aircraft panels or a hull, can be employed and function with the device to convert EM waves from linear polarisation to circular polarisation. Advantageously, this arrangement tends to negate the need for conventional exposed antennas on said vehicle, i.e. the antenna does not extend out with the existing profile of the vehicle, which avoids drag penalties or low observability penalties, for example, reducing the radar cross section of the vehicle. Whilst in this example the ground plane is a grounded metal substrate, this is considered non-limiting and other ground planes may be employed such as metal alloys, metalloids, metal matrix composites or any other conductive surface.

According to a second aspect of the present invention there is provided an antenna system for a communications apparatus, comprising: an antenna arranged to generate polarised electromagnetic radiation; and a polarisation converter according to the first aspect. The antenna may be arranged to generate linearly polarised electromagnetic radiation. The antenna system may form part of a satellite communications receiver, such as a GPS, GLONASS or Galileo receiver. In other words, the antenna system may form part of a navigation system. The antenna system form part of a telecommunications transceiver, such as a broadband telecommunications transceiver including 4G and 5G. The antenna system may form part of a tactical datalink receiver, such as a Link-16 or Link-22 receiver.

In this way, linearly polarised radiation may be generated by an antenna, and converted to circular polarised radiation. Antennas arranged to generate linearly polarised EM radiation are readily available and low-cost, especially compared with antenna arranged to generate circularly polarised radiation. Thus, facilitating the generation of circularly polarised radiation in this way tends to be highly advantageous.

According to a third aspect of the present invention there is provided a vehicle comprising an antenna system according to the second aspect. The vehicle may be an aircraft, such as a manned or unmanned aircraft. The antenna system may provide a means for the aircraft to receive communications signals from a base station. Alternatively, the antenna system may provide means for the aircraft to receive navigation data from a satellite navigation system. In other words, the vehicle may comprise a navigation system or communications system comprising the antenna system.

In this way, advantages in communication and sensing may be realised.

According to a fourth aspect of the present invention there is provided a method of converting linearly polarised radiation to circularly polarised radiation comprising: providing a polarisation converter, communications apparatus, or vehicle according to the first, second or third aspects respectively; disposing the first element array layer, dielectric layer and second element array layer above a ground plane; and irradiating the device with linearly polarised radiation, the reflected radiation being circularly polarised.

In one example, the method comprises reflecting linearly polarised radiation from the polarisation converter, antenna system or vehicle thereby to generate, or transmit, circularly polarised radiation. In one example, the method comprises mounting a polarisation converter or antenna system on a vehicle.

According to a fifth aspect of the present invention there is provided a method of manufacturing a polarisation converter comprising the steps of: providing a first element array layer extending in a plane and a second element array layer extending in a plane, each element array layer having a first and second axis parallel to the plane of the respective element array layer, the first axis and second axis being perpendicular axes, wherein one or both of the element array layers exhibit an anisotropic spatial property; and layering: the first element array layer comprising a first array of spaced apart electrically conductive dipole elements; the second element array layer comprising a second array of spaced apart electrically conductive dipole elements; and a dielectric layer extending in a plane separating the first element array layer and the second element array layer.

Features of any of the above aspects may be combined as desired or as appropriate.

BRIEF DESCRIPTION OF THE FIGURES

Embodiments of the present disclosure will now be described, by way of example only, with reference to the accompanying drawings in which.

DETAILED DESCRIPTION

Figure 1:
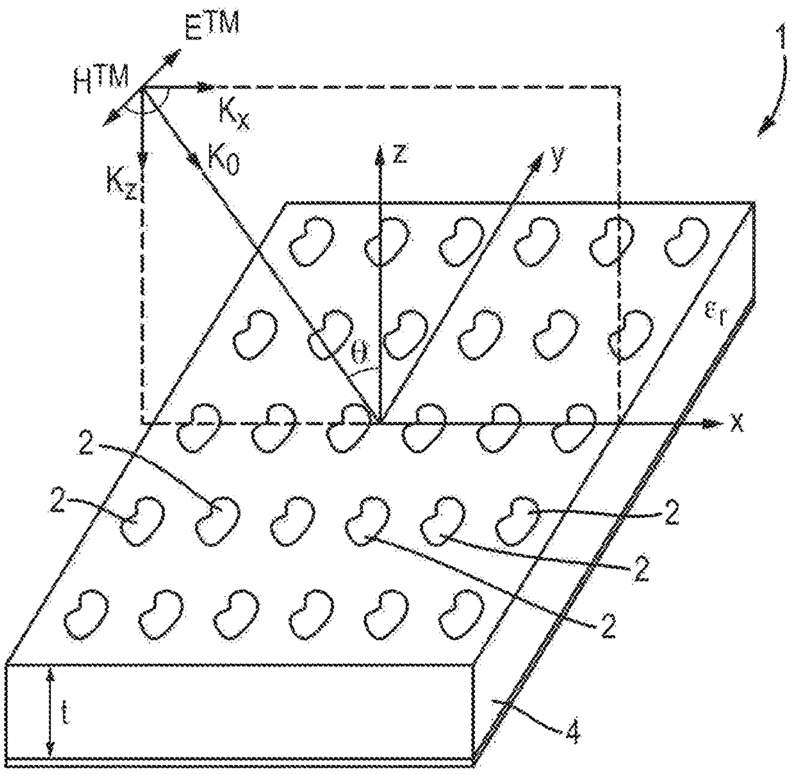
FIG. 1 shows a schematic perspective view of a linear-to-circular polarisation converter according to the prior art.

Referring to FIG. 1, a linear-to-circular polarisation converter 1 according to the prior art is shown. The polarisation converter 1 comprises an arrangement of dipole elements 2 arranged in a single layer and printed on a grounded dielectric slab 4.

The direction of propagation of an incident EM wave (which may be referred to as the "angle of incidence") is shown at an angle θ measured from the axis normal to the plane of the layer of dipole elements 2 (the z-axis).

Figure 2:
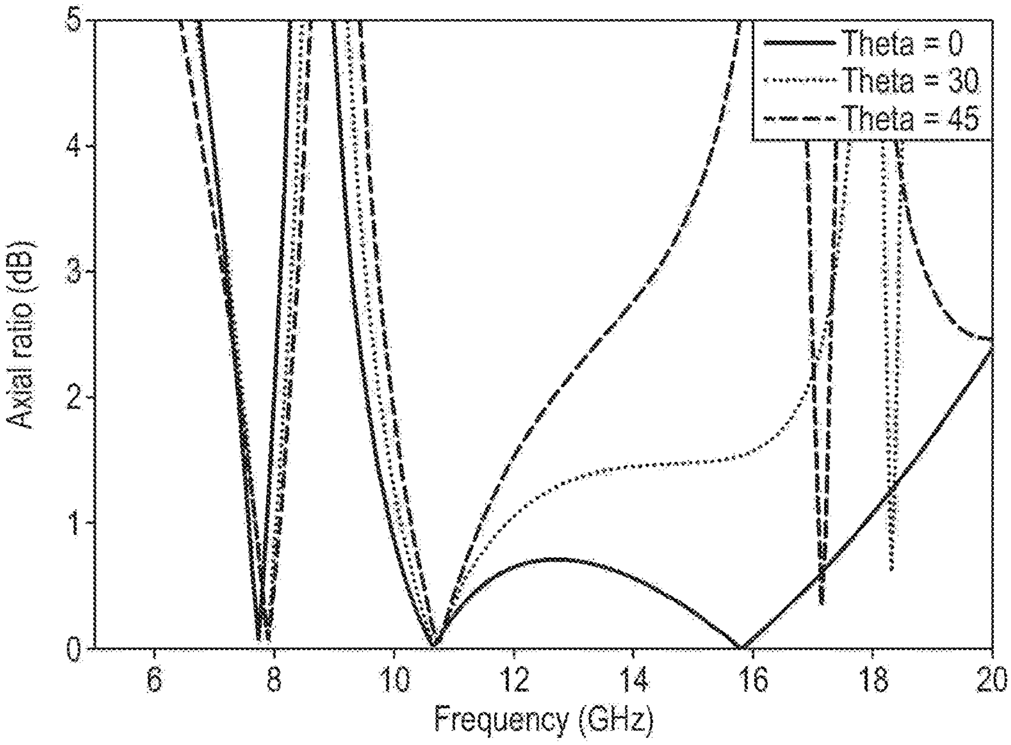
RELATED ART Fig. 2
FIG. 2 shows a graph of axial ratio of reflected radiation versus frequency, at different angles of incidence, for the prior art converter of FIG. 1.

Referring to FIG. 2, axial ratio of reflected radiation versus frequency, at different angles of incidence, for the converter 1 is shown in graphical representation. The term "angular stability" is used to refer to the amount of variation of the relationship between axial ratio and frequency for different angles of incidence of incident EM waves. As shown in the Figure, the converter 1 has a large variation in the axial ratio of the reflected radiation at frequencies above around 10 GHz as the angle of incidence is varied from $\theta=0$, to $\theta=30$, to $\theta=45$. That is, the converter 1 has poor angular stability at frequencies above around 10 GHz.

Figure 3:
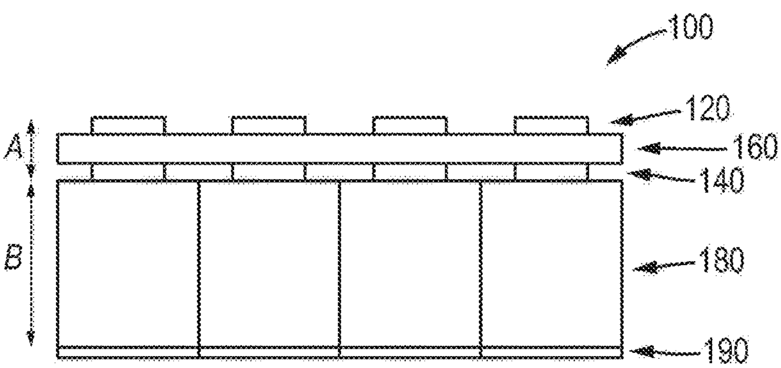
FIG. 3 shows a schematic side profile view of a polarisation converter according to an embodiment.

Referring to FIG. 3, a polarisation converter 100 according to an embodiment is shown. More specifically, the polarisation converter is for converting linearly polarised incident EM radiation into circularly polarised radiation. In another embodiment, the polarisation converter may be modified to convert circularly polarised incident radiation into linearly polarised radiation. The converter 100 comprises a first element array layer 120, and second element array layer 140 and a dielectric layer 160. The converter 100 further comprises a Taconic RF35 substrate 180. The converter 100 further comprises a ground plane in the form of a grounded metal substrate 190. The first element array layer 120, second element array layer 140 and dielectric layer 160 are disposed above the grounded metal substrate 190. In this exemplary embodiment, an incident EM wave is reflected from the grounded metal substrate 190, and through interaction with the first element array layer 120 and second element array layer 140 is converted from linear-to-circular polarisation. In this example, the grounded metal substrate 190 forms part of the converter 100, although the person skilled in the art will appreciate that the substrate 190 may be provided separately, and for example may form part of a structure on which the converter 100 is mounted, for example as part of a ground-based vehicle, watercraft or aircraft.

The first element array layer 120 extends in a plane, referred to as a "first plane", which in this exemplary embodiment is a horizontal plane. The first element array layer 120 comprises a first array of spaced apart electrically conductive dipole elements 122.

The second element array layer 140 extends in a plane, referred to as a "second plane", which in this exemplary embodiment is a horizontal plane. The second element array layer 140 comprises a second array of spaced apart electrically conductive dipole elements 142.

The dielectric layer 160 extends in a plane, referred to as a "third plane", which in this exemplary embodiment is a horizontal plane. The dielectric layer 160 separates the first element array layer 120 and the second element array layer 140. That is, the dielectric layer 160 electrically insulates first element array layer 120 from the second element array layer 140. The dielectric layer 160 is formed of a polyimide.

The dipole elements are formed on either side of the dielectric layer 160. In this exemplary embodiment, the second array of dipole elements 142 are formed above the substrate 180 and below the dielectric layer 160. The first array of dipole elements 122 are formed above the dielectric layer 160. The dipole elements 122, 142 are formed of copper. The first element array layer 120, second element array layer 140 and dielectric layer 160 are substantially parallel.

Figure 4B:
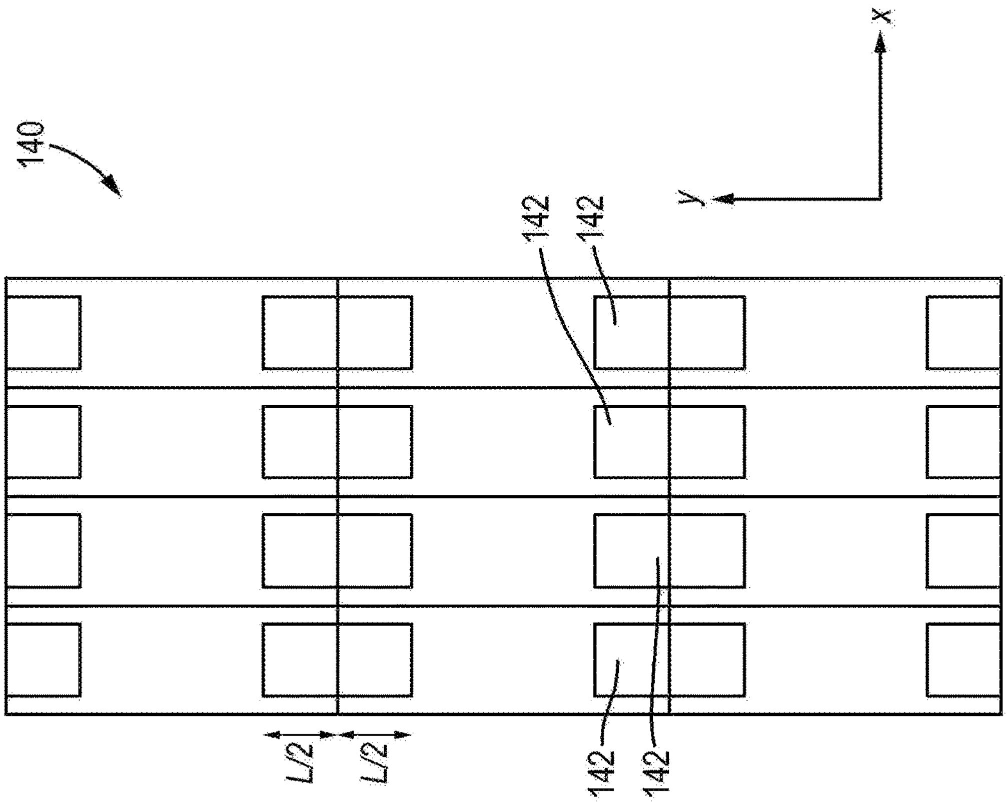
FIGS. 4(*a*) and (*b*) show schematic plan views of, in isolation, the first element array layer and second element array layer of the converter of FIG. 3.
Figure 4A:
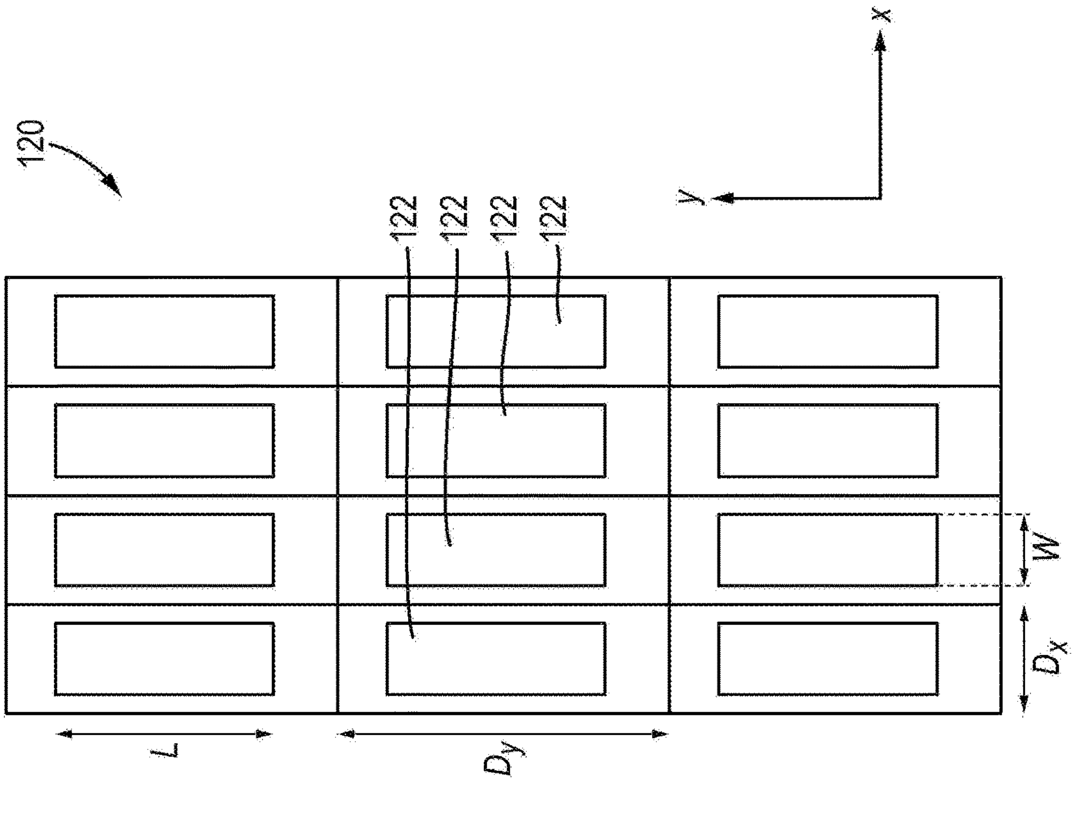

Referring to FIGS. 4(*a*) and 4(*b*), element array layers 120, 140 are shown in isolation and in plan view. As shown in the Figures, each element array layer 120, 140 has a first and second axis parallel to the plane of the respective element array layer, the first axis and second axis being perpendicular axes.

One or both of the element array layers 120, 140 exhibits an anisotropic spatial property. In this way, linear-to-circular polarisation conversion is facilitated; the anisotropic design imposes a differential phase shift to the two polarisations (TM and TE) of the incoming plane wave. By "anisotropic spatial property" it is meant that a spatial property differs between the first and second axes, in one or both of the element array layers 120, 140. Anisotropy is achievable through periodicity of the element array layers 120, 140, spacing of the dipole elements 122, 142, and/or shape or form of the dipole elements 122, 142.

The first and second axes are illustrated as "y" and "x" axes in the Figures. As shown, both of the arrays of dipole elements 122, 142 exhibit an anisotropic spatial property. That is, in the illustrated embodiment, the spacing between dipole elements 122, 142 is different in the first and second axes. In this way, in one of the axes the elements in the first element array layer 120 overlap with elements in the second element array layer 140.

Additionally, the periodicity of the array of dipole elements is different in the first and second axes. In this way, there are more dipoles per unit length in the second axis (the "x" axis) compared to the first axis (the "y" axis). Here, both of the arrays of dipole elements has a first periodicity measured along the first axis, and a second periodicity measured along the second axis, the second periodicity being different to the first periodicity. The first element array layer 120 and second element array layer 140 have the same first and second periodicity.

As will be understood from FIGS. 4(*a*) and 4(*b*), in the assembled converter 100 the dipole elements 142 of the second element array layer 140 are each located laterally displaced with respect to the dipole elements 122 of the first element array layer 120. This may be described as the arrays being "shifted" relative to one another. Such an arrangement is anisotropic.

Furthermore, in the assembled converter 100 the dipole elements 142 of the second element array layer 140 are each located laterally aligned along the second axis with respect to the dipole elements 122 of the first element array layer 120. This facilitates element coupling, which will be described in further detail below.

As mentioned above, anisotropy is also realised by the shape or form of the dipole elements. In this exemplary embodiment, the dipole elements 122, 142 of the first element array 120 layer and second element array layer 140 exhibit an anisotropic spatial property. As shown, each dipole element has a first dimension measured along the first axis, and a second dimension measured along the second axis. The first and second dimensions are different. In this illustrated embodiment, each dipole element 122, 142 has a solid rectangular shape. The person skilled in the art will appreciate that other shapes of dipole elements are suitable and also have a different first and second dimension, for example rectangular loops, solid ovoids and/or ovoid loops.

Figure 5:
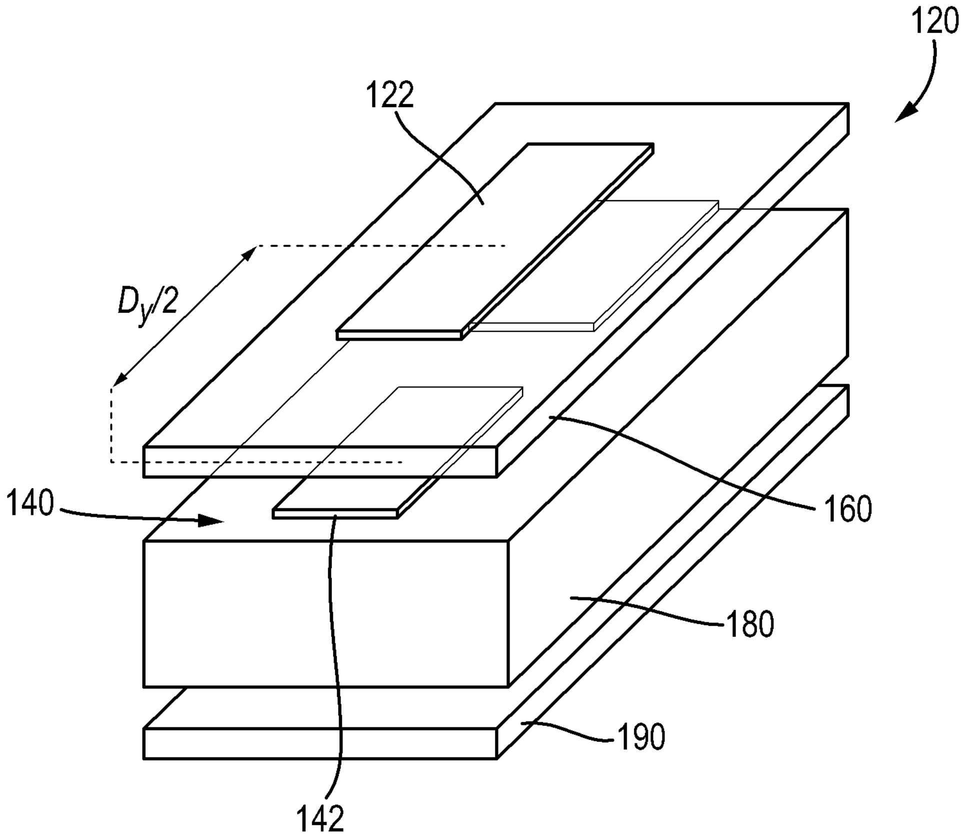
FIG. 5 shows a schematic exploded perspective view of a portion of the converter of FIG. 3.

As will be understood from the plan views of the element array layers 120, 140 shown in FIGS. 4(*a*) and 4(*b*), and also from the portion of the converter 100 illustrated in FIG. 5 shown having a transparent dielectric layer 160, in plan view, a region of one of the dipole elements 122 of the first element array layer 120 overlaps a region of one or more of the dipole elements 142 of the second element array layer 140. In this exemplary embodiment, in plan view, one of the dipole elements 122 of the first element array layer 120 overlaps an end region of two of the dipole elements 142 of the second element array layer 140. This overlap provides a strong capacitive coupling of the elements between the layers 120, 140. This leads to improvements in angular stability of the converter 100, which will be described in further detail below. In this exemplary embodiment, there is a total overlap (i.e. including both overlapping ends) of around 26% of the length of the dipole element.

Dimensions of a converter 100 according to an exemplary embodiment are provided with reference to FIGS. 3, 4(*a*), 4(*b*) and 5. In the exemplary embodiment described herein, which is the exemplary embodiment to which the graphs of FIGS. 7 and 8 relate, the converter 100 has the following dimensions: A (height of the layers 120, 140, 160)=0.12 mm; B (height of the substrate 180)=1.524 mm; L (length of a dipole element)=2.15 mm; W (width of a dipole element) =0.5 mm; Dx (width of a "unit cell" of the element array layer 120, 140)=1 mm; Dy (length of a "unit cell" of the element array layer 120, 140)=3.75 mm; Dy/2 (shifting of dipole elements 142 of the second element array layer 140 with respect to the dipole elements 122 of the first element array layer along the y axis, when viewed in plan view) =1.875 mm; dipole element length overlap at one end region=0.275 mm.

The dimensions of the exemplary embodiment are provided without limitation or loss of generality of the structure of the converter 100. The person skilled in the art will appreciate that variations of the dimensions are possible whilst still functioning as a linear-to-circular polarisation converter.

Figure 6A:
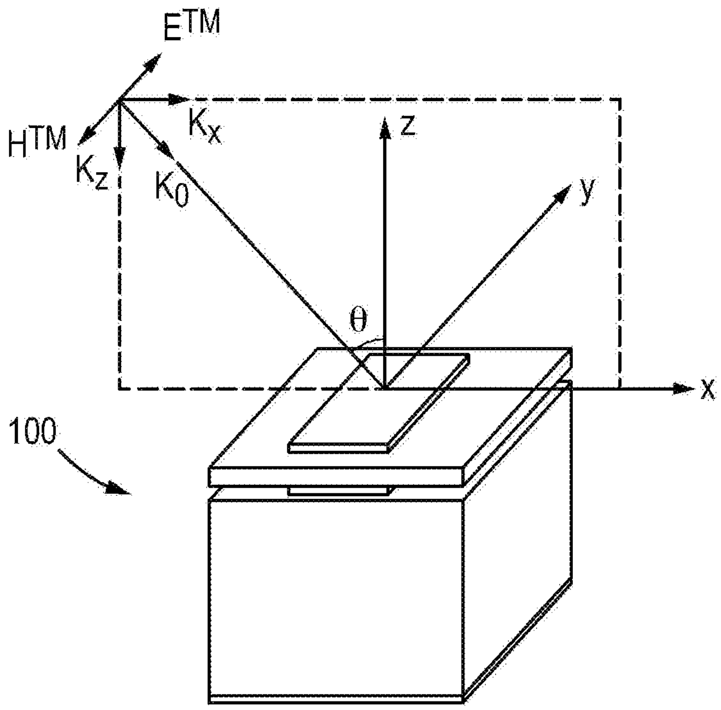
FIGS. 6(*a*) and (*b*) show the geometrical configuration of TM and TE incidence on a portion of the converter of FIG. 3.
Figure 6B:
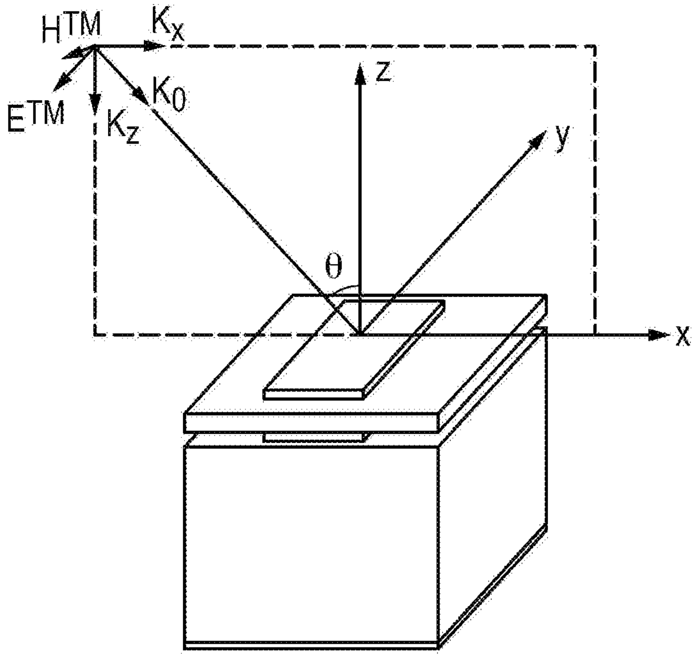

Referring to FIGS. 6(*a*) and 6(*b*), the geometrical configuration of an incident EM wave with the converter 100 is shown, with only a portion of the converter 100 being shown in the Figures. The direction of propagation of a linearly polarised incident EM wave (which may be referred to as the "angle of incidence") is shown at an angle θ measured from the axis normal to the planes of the element array layers 120, 140 and dielectric layer 160. FIGS. 6(*a*) and 6(*b*) illustrate the TM and TE components respectively of the linearly polarised incident wave, with equal magnitude and phase for θ=0. The E-field, then, lies at an angle of 45° or 135° to the y-axis. The incident wave has an electric field component E, a magnetic field component H, and a wave vector k.

Figure 7A:
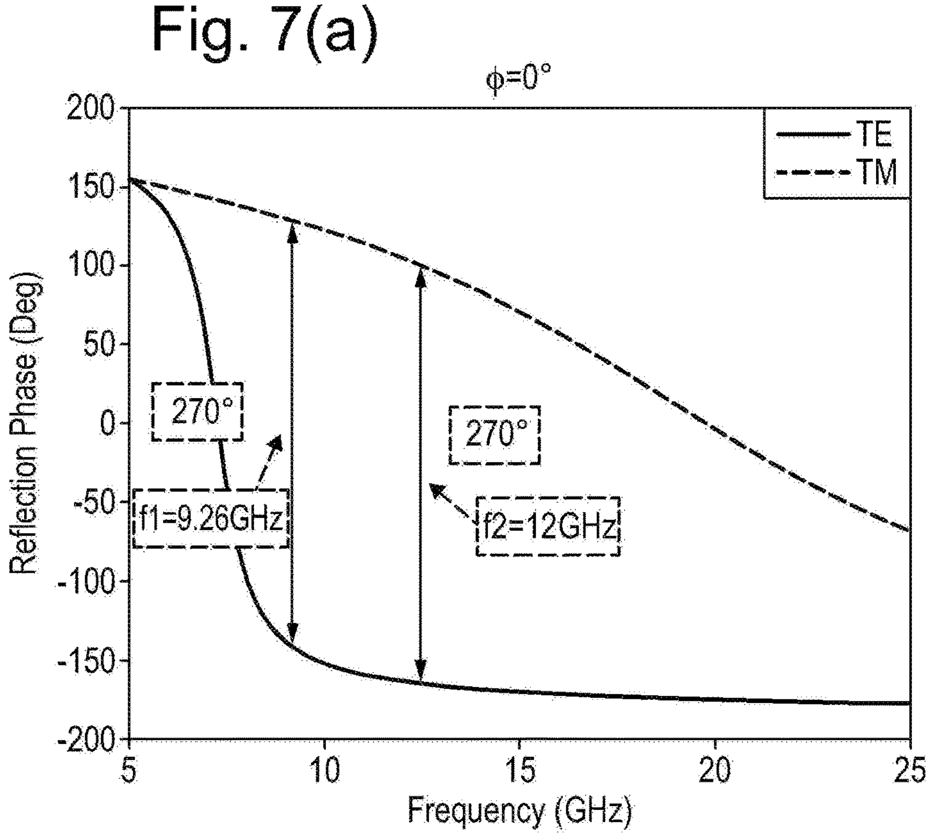
FIGS. 7(*a*) and (*b*) show graphs of reflection phase for TE and TM components.
Figure 7B:
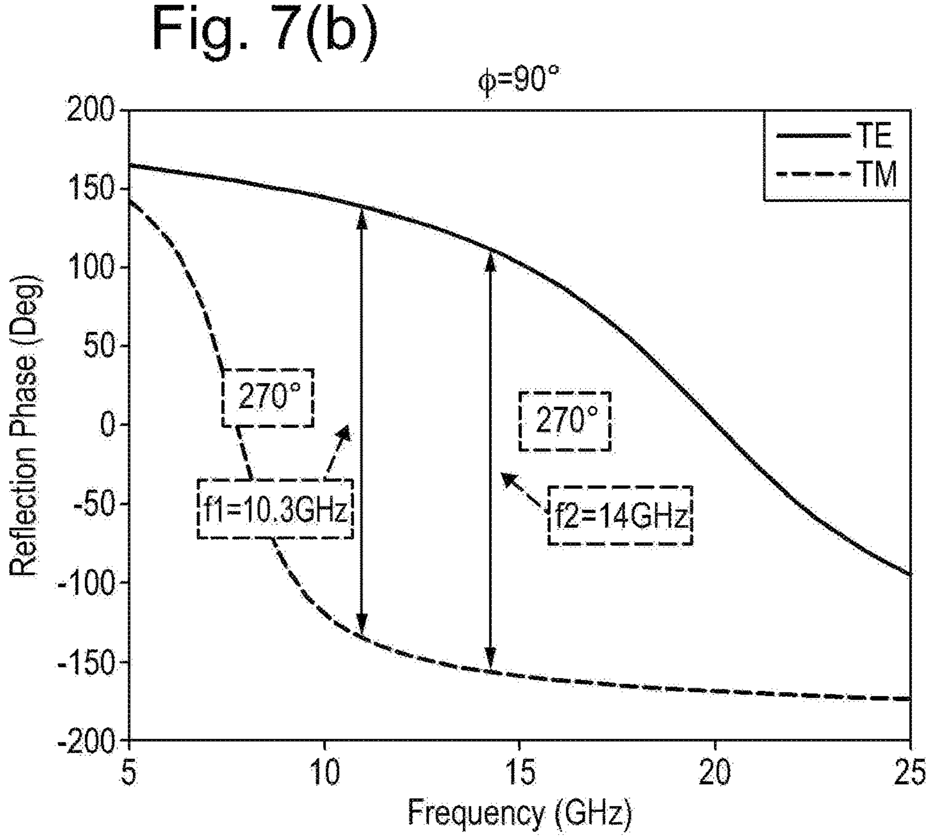

Referring to FIGS. 7(*a*) and 7(*b*), graphs of reflection phase for TE (solid lines) and TM (dashed lines) components versus frequency are shown. FIGS. 7(*a*) and 7(*b*) illustrate the reflection phase versus frequency in two mutually orthogonal planes of incidence; FIG. 7(*a*) shows the x-z plane or Φ=0°, and FIG. 7(*b*) shows the y-z plane or Φ=90°. In order for the converter 100 to convert a linearly polarised incident wave to a circularly polarised reflected wave, the converter 100 should generate a phase difference of odd multiples of 90° to the incident wave. In FIGS. 7(*a*) and 7(*b*), the reflection phase is shown when the linearly polarised wave is incident at an angle of θ=45° to the y-axis. As can be determined from the graphs, linear-to-circular polarisation is achieved at various of frequencies, where the reflection phase is equal to 270°.

Figure 8A:
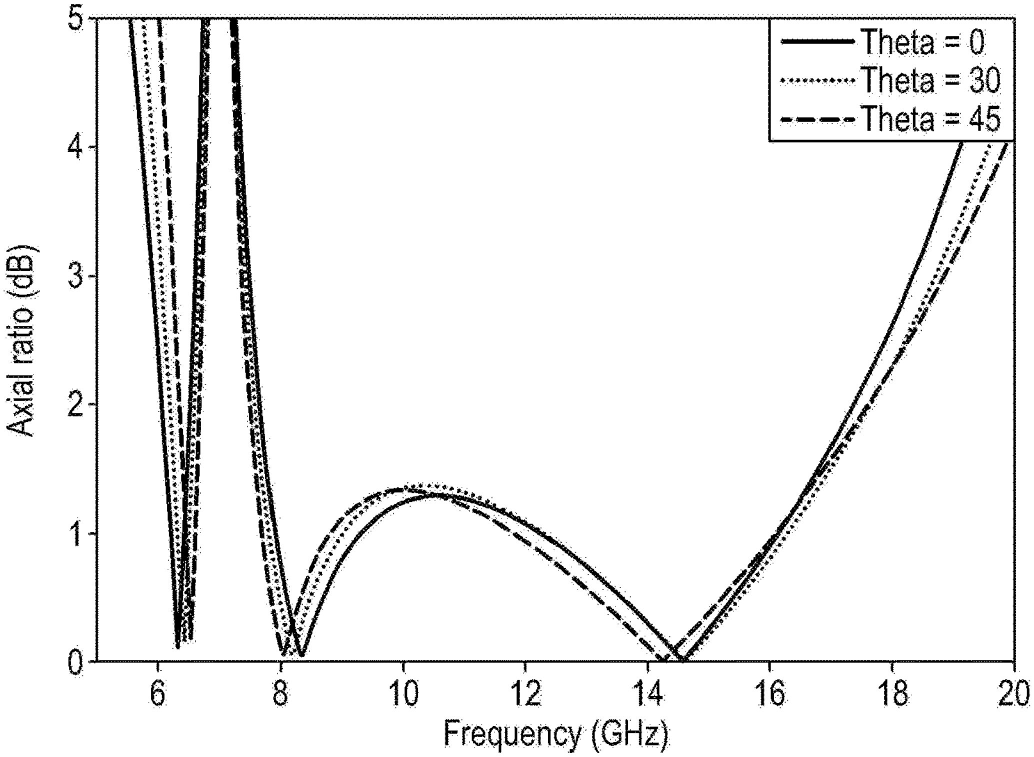
FIGS. 8(*a*) and (*b*) show graphs of axial ratio of reflected radiation versus frequency, at different angles of incidence.
Figure 8B:
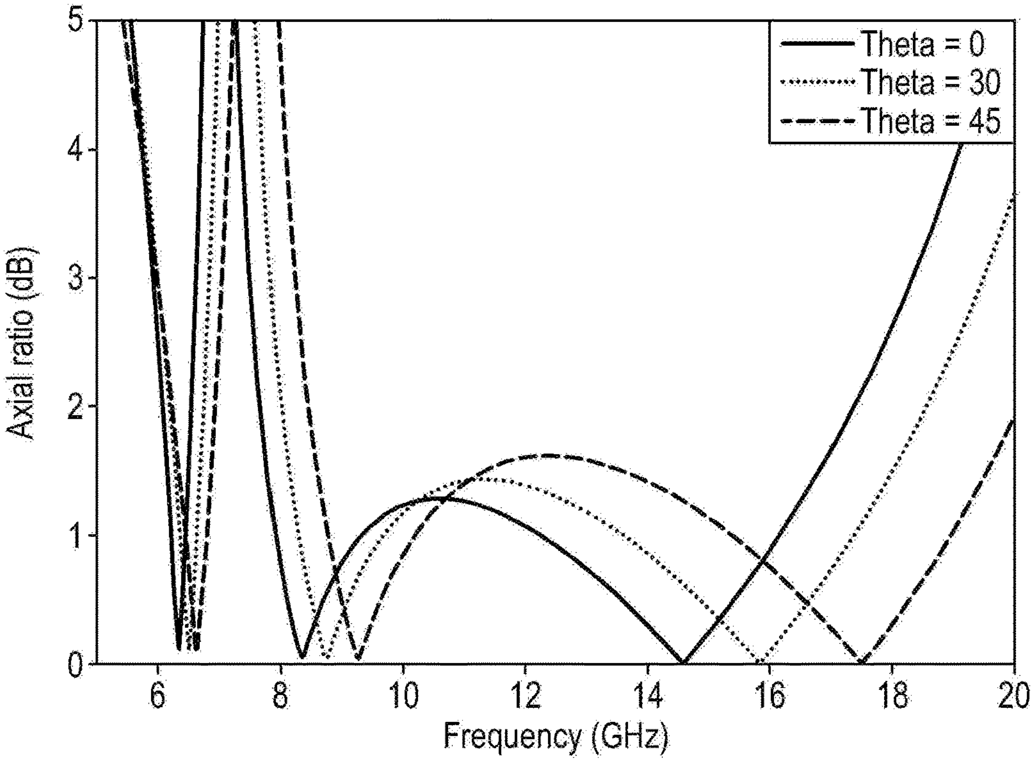

Referring to FIGS. 8(*a*) and 8(*b*), axial ratio of reflected radiation versus frequency, at different angles of incidence, for the converter 100 is shown in graphical representation. As mentioned above, the term "angular stability" is used to refer to the amount of variation of the relationship between axial ratio and frequency for different angles of incidence of incident EM waves.

FIGS. 8(*a*) and 8(*b*) illustrate the axial ratio versus frequency in two mutually orthogonal planes of incidence; FIG. 8(*a*) shows the x-z plane or $\Phi=0°$, and FIG. 8(*b*) shows the y-z plane or $\Phi=90°$. As can be established from the figure, the converter 100 has a reduced variation in the axial ratio of the reflected radiation, when compared with the graph of FIG. 2 which relates to the conventional converter 1, at frequencies above 10 GHz as the angle of incidence is varied in the same manner from $\theta=0$ (solid line), to $\theta=30$ (dotted line), to $\theta=45$ (dashed line). That is, the converter 100 has improved angular stability at frequencies above around 10 GHz.

The high element coupling, due to the above described arrangement of element array layers and dipole elements, leads to the improvements in angular stability demonstrated herein. Element coupling provides an increase of the effect element. This results in a change of the array resonant frequency. From the Figures, it is understood that the circular polarisation performance in terms of axial ratio, angular stability and 3-dB-axial ratio bandwidth is satisfactory for the frequency range between 8.2-18.3 GHz for both TE and TM in X band and KU band. This frequency range is obtained using a converter 100 having the dimensions (i.e. dipole element dimensions, layer heights etc.) as described above.

The person skilled in the art will appreciate that other dimensions are possible whilst still maintaining angular stability, but the frequency range may be different where converter dimensions are changed. For example, a larger (or longer) dipole will have the effect of shifting the frequency range to lower frequencies, as it will couple to incident fields of longer wavelengths. Furthermore, increasing the overlap of the dipoles has the effect of increasing the capacitive coupling of the elements between the layer 120, 140. This will, in turn, shift the frequency range to lower frequencies. The choice of substrate 180 also affects the operative frequency range. A substrate material with a high relative permittivity will have the effect of decreasing the effective wavelength of the incoming field. This means that the dipoles appear "electrically longer" and therefore the operative frequency range of the converter 100 will be shifted lower.

It will be understood by the person skilled in the art that the structure of the converter 100 tends to reduce the effects of grating lobes, which are undesirable features in antenna design. The grating lobes are pushed to higher frequencies due to the design of the converter 100, in particular the change in the resonant frequency due to the high element coupling, leading to benefits in angular stability. Sensitivity to the angle of incidence of incident EM radiation thereby tends to be reduced.

Figure 9:
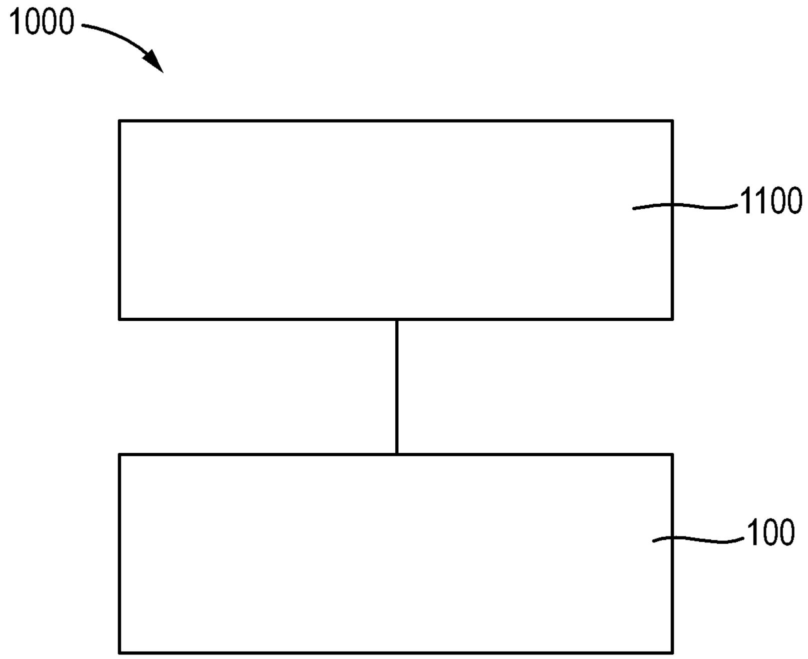
FIG. 9 shows an antenna system for a communications apparatus.

Referring to FIG. 9, an antenna system 1000 is shown. The antenna system 1000 comprises an antenna 1100 arranged to generate linearly polarised EM radiation. Such antennas are well known in the art, but may include a whip antenna, stripline antenna, monopole antenna, dipole antenna, patch antenna. The antenna system 1000 may form part of a communications apparatus for providing a communications link with another communications apparatus, where that link operates according to a standard such as GSM, CDMA, LTE, WiMax, future 5G standards or the like within the 698-3600 MHZ spectrum region. The antenna system 1000 may be coupled to a transceiver, transmitter or receiver, power source and other standard components to enable a communications link. The receiver may be a satellite navigation receiver, such as for receiving navigation data from GPS, GLONASS or Galileo systems. In other words, the antenna system 1000 may form part of a navigation system.

Figure 10:
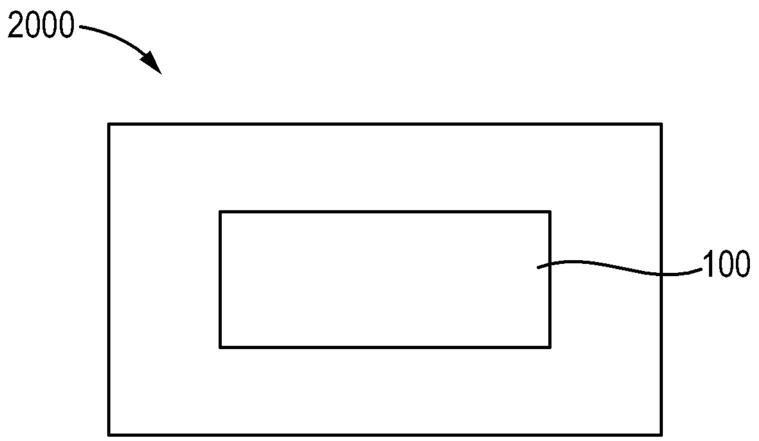
FIG. 10 shows a vehicle according to an embodiment.

The antenna system 1000 further comprises a polarisation converter 100 according to an embodiment Referring to FIG. 10, a vehicle, for example a ground-based vehicle, aircraft, watercraft, spacecraft or satellite 2000 is shown. The vehicle 2000 comprises a polarisation converter 100. The vehicle 2000 may comprise a antenna system 1000 as described with reference to FIG. 9. In other words, the vehicle may comprise a navigation system having the antenna system 1000.

Figure 11:
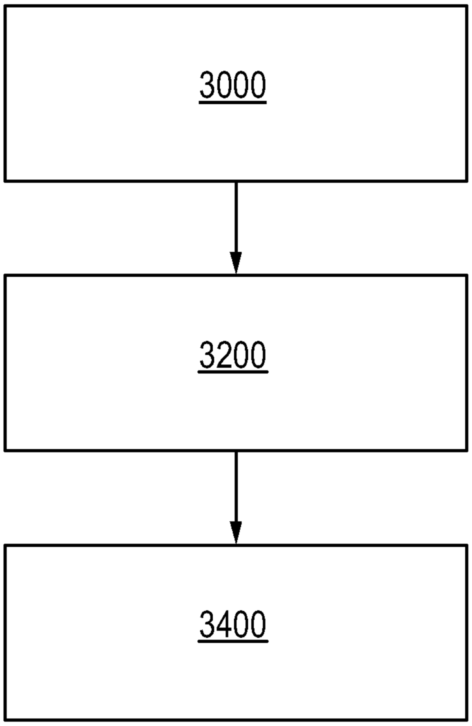
FIG. 11 shows general methodology principles.

Referring to FIG. 11, methodology principles according to an embodiment are shown. The method is a method of converting linearly polarised radiation to circularly polarised radiation. Step 3000 comprises providing a polarisation converter 100, antenna system 1000 or vehicle 2000, for example a ground-based vehicle, aircraft or watercraft, according to an embodiment. Step 3200 comprises disposing the first element array layer, dielectric layer and second element array layer above a ground plane. The ground plane acts as a reflective surface from which the wave is reflected. Step 3400 comprises irradiating the device with linearly polarised radiation, the reflected radiation being circularly polarised. Interaction with the element array layers, and in particular as a result of their anisotropic property, causes linear-to-circular polarisation conversion.

Figure 12:
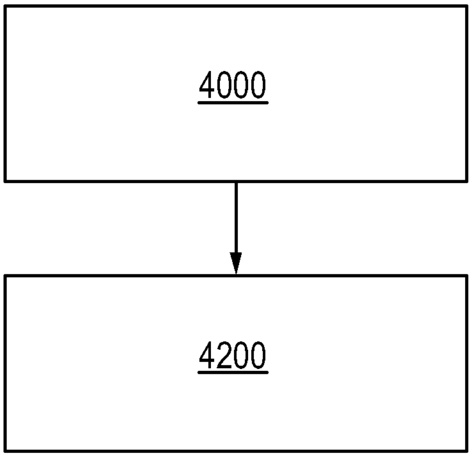
FIG. 12 shows general methodology principles.

Referring to FIG. 12, methodology principles according to an embodiment are shown. The method is a method of manufacturing a linear-to-circular polarisation converter 100. Step 4000 comprises providing a first element array layer extending in a plane and a second element array layer extending in a plane, each element array layer having a first and second axis parallel to the plane of the respective element array layer, the first axis and second axis being perpendicular axes, wherein one or both of the element array layers exhibit an anisotropic spatial property. Step 4200 comprises layering: the first element array layer comprising a first array of spaced apart electrically conductive dipole elements; the second element array layer comprising a second array of spaced apart electrically conductive dipole elements; and a dielectric layer extending in a plane separating the first element array layer and the second element array layer.

Polarisation converters 100 as described above find application, and advantage, in satellite, communication, navigation and sensing systems. For example, in satellite applications, such converters can be used to minimise the effect of Faraday rotation caused by the ionosphere. Further advantages are found in multipath propagation and rain clutter suppression.

At least some of the example embodiments described herein may be constructed, partially or wholly, using dedicated special-purpose hardware. Terms such as 'component', used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

The invention claimed is:

1. A linear-to-circular polarisation converter, comprising:

a first element array layer extending in a plane comprising a first array of spaced apart electrically conductive dipole elements;

a second element array layer extending in a plane comprising a second array of spaced apart electrically conductive dipole elements; and a dielectric layer extending in a plane separating the first element array layer and the second element array layer, each element array layer having a first and second axis parallel to the plane of the respective element array layer, the first axis and second axis being perpendicular axes, wherein:

one or both of the element array layers exhibits an anisotropic spatial property;

the dipole elements of the second element array layer are each located laterally displaced along the first axis with respect to the dipole elements of the first element array layer;

the dipole elements of the second element array layer are each located laterally aligned along the second axis with respect to the dipole elements of the first element array layer; and in plan view, a region of one of the dipole elements of the first element array layer overlaps a region of two of the dipole elements of the second element array layer.

2. The linear-to-circular polarisation converter as claimed in claim 1, wherein one or both of dipole elements of the first element array layer and/or the second element array layer exhibits an anisotropic spatial property.

3. The linear-to-circular polarisation converter as claimed in claim 2, wherein one or both of dipole elements of the first element array layer and/or the second element array layer has a first periodicity measured along the first axis and a second periodicity measured along the second axis, the second periodicity being different to the first periodicity.

4. The linear-to-circular polarisation converter as claimed in claim 3, wherein the first element array layer and second element array layer have the same first and second periodicity.

5. The linear-to-circular polarisation converter as claimed in claim 1, wherein a plurality of the dipole elements of the first element array layer and/or the second element array layer exhibit an anisotropic spatial property.

6. The linear-to-circular polarisation converter as claimed in claim 5, wherein each dipole element has a first dimension measured along the first axis, and a second dimension measured along the second axis, the first and second dimensions being different.

7. The linear-to-circular polarisation converter as claimed in claim 1, wherein, in the plan view, between 20-30% of a length of one of the dipole elements of the first element array layer overlaps a region of one or more of the dipole elements of the second element array layer.

8. The linear-to-circular polarisation converter as claimed in claim 1, further comprising a ground plane, wherein the first element array layer, dielectric layer and second element array layer are disposed above the ground plane.

9. The linear-to-circular polarisation converter of claim 8, further comprising a substrate between the second element array layer and the ground plane, where the substrate has a permittivity based on an operating frequency range of the linear-to-circular polarisation converter.

10. An antenna system for a communications apparatus, comprising:

an antenna arranged to generate linearly polarised electromagnetic radiation; and a linear-to-circular polarisation converter as claimed in claim 1, where the linear-to-circular polarisation converter converts the linearly polarised electromagnetic radiation from the antenna into a circular polarisation.

11. A vehicle comprising the antenna system according to claim 10.

12. The vehicle of claim 11, wherein the linear-to-circular polarisation converter further comprises a ground plane, wherein the first element array layer, dielectric layer and second element array layer are disposed above the ground plane and where the ground plane is a surface of the vehicle.

13. The vehicle of claim 11, wherein the vehicle is an aircraft.

14. The vehicle of claim 13, wherein the aircraft is an unmanned aerial vehicle.

15. The antenna system of claim 10, wherein the communications apparatus is a satellite communications receiver.

16. The antenna system of claim 10, wherein the communications apparatus is incorporated in a navigation system.

17. The linear-to-circular polarisation converter of claim 1, wherein a dipole element of the first element array layer has a first dimension measured along the first axis and a dipole element of the second element array layer has a second dimension measured along the first axis and the first dimension is larger than the second dimension.

18. The linear-to-circular polarisation converter of claim 1, wherein the separating provided by the dielectric layer electrically insulates the first element array layer from the second element array layer.

19. The linear-to-circular polarisation converter of claim 1, wherein the dielectric layer is formed from a synthetic polymer material.

20. A method of manufacturing a linear-to-circular polarisation converter, comprising the steps of:

providing a first element array layer extending in a plane and a second element array layer extending in a plane, each element array layer having a first and second axis parallel to the plane of the respective element array layer, the first axis and second axis being perpendicular axes, wherein one or both of the element array layers exhibit an anisotropic spatial property; and layering:

the first element array layer comprising a first array of spaced apart electrically conductive dipole elements;

the second element array layer comprising a second array of spaced apart electrically conductive dipole elements; and a dielectric layer extending in a plane separating the first element array layer and the second element array layer, wherein:

the dipole elements of the second element array layer are each located laterally displaced along the first axis with respect to the dipole elements of the first element array layer;

the dipole elements of the second element array layer are each located laterally aligned along the second axis with respect to the dipole elements of the first element array layer; and in plan view, a region of one of the dipole elements of the first element array layer overlaps a region of two of the dipole elements of the second element array layer.

* * * * *